(12) United States Patent
Thurmann et al.

(10) Patent No.: US 7,219,780 B2
(45) Date of Patent: May 22, 2007

(54) PISTON-CYLINDER UNIT

(75) Inventors: Peter Thurmann, Koblenz (DE); Hans Ihrlich, Kaltenengers, DE (US); Arnold Schilz, Lahnstein (DE); Hans Jürgen Hofmann, Dahlheim (DE); Ines Kistenbrügger, Koblenz (DE); Michael Auer, Lehmen (DE)

(73) Assignee: Stabilus GmbH, Koblenz (DE)

( * ) Notice: Subject to any disclaimer, the term of this patent is extended or adjusted under 35 U.S.C. 154(b) by 606 days.

(21) Appl. No.: 10/699,229

(22) Filed: Oct. 31, 2003

(65) Prior Publication Data

US 2004/0144605 A1    Jul. 29, 2004

(30) Foreign Application Priority Data

Nov. 2, 2002  (DE) ................ 102 50 967
Oct. 21, 2003  (DE) ................ 103 48 768

(51) Int. Cl.
*F16F 9/36* (2006.01)

(52) U.S. Cl. .............. 188/322.17; 188/322.12

(58) Field of Classification Search ........... 188/300, 188/322.12, 322.16, 322.17, 322.18; 267/64.12, 267/120; 248/161
See application file for complete search history.

(56) References Cited

U.S. PATENT DOCUMENTS 4,281,884 A * 8/1981 Freitag et al. ............... 439/32

5,332,260 A     7/1994 Heinrichs et al.
5,791,445 A *  8/1998 Kaufmann et al. .... 188/322.12

FOREIGN PATENT DOCUMENTS

| DE | 34 34 011 | 3/1986 |
|---|---|---|
| DE | 42 09 985 | 9/1993 |
| JP | 52-125984 | 10/1977 |
| JP | 60-169443 | 11/1985 |
| JP | 08324019 | 12/1996 |
| KR | 0161283 | 12/1998 |

OTHER PUBLICATIONS

Office Action dated Aug. 24, 2005 issued for Korean Patent Application No. 10-2003-0077116 by the Korean Patent Office.
Office Action dated Jan. 19, 2006 issued for Japanese Patent Application No. 2003-374069 by the Japan Patent Office.

* cited by examiner

*Primary Examiner*—Christopher P. Schwartz
(74) *Attorney, Agent, or Firm*—Cohen Pontani Lieberman & Pavane LLP

(57) ABSTRACT

A piston, which has a piston rod, is guided with freedom of axial movement in a cylindrical pressure tube. At one end of the pressure tube, the piston rod passes through an opening in an end wall, which closes off the end of the pressure tube. The pressure tube is surrounded by a heat-shrink sleeve, which, at the exit end of the piston rod, extends more-or-less radially inward and has a pass-through opening through which the piston rod extends. The ring-shaped end surface at the piston rod exit end of the pressure tube is enclosed by the heat-shrink sleeve.

20 Claims, 4 Drawing Sheets

PISTON-CYLINDER UNIT

BACKGROUND OF THE INVENTION

1. Field of the Invention

The invention pertains to a piston-cylinder unit, especially a pneumatic spring, with a cylindrical pressure tube, in which a piston is guided with freedom of axial movement. The piston has a piston rod at least at one end, which is guided to the outside through an opening in a wall, which closes off the end of the pressure tube, and the pressure tube is surrounded by a heat-shrink sleeve, which extends more-or-less radially inward at the exit end of the piston rod and has a pass-through opening through which the piston rod projects.

2. Description of the Related Art

In a piston-cylinder unit of this type, it is known that the pressure tube can be covered by a shrink-fit plastic sleeve, the heat-shrink sleeve covering the outside surfaces of the pressure tube where the end has been flanged over toward the inside. Moisture can be drawn into the gap between the pressure tube and the heat-shrink sleeve where the gap is open to the outside; this moisture causes corrosion on the outside surface of the pressure tube, which is disadvantageous.

SUMMARY OF THE INVENTION

The object of the invention is therefore to provide a piston-cylinder unit of the type indicated above with protection against the corrosion of the outside contour of the pressure tube, which protection also prevents crevice corrosion on the outside surface of the pressure tube.

According to the invention, the ring-shaped end surface of the pressure tube at the end through which the piston rod projects is enclosed by the heat-shrink sleeve.

Because the heat-shrink sleeve tightly encloses the pressure tube, an untreated tube can be used for the pressure tube, and complicated painting operations to provide a protective coating on the pressure tube can be eliminated. In addition, the heat-shrink sleeve is much less sensitive to scratching and scoring than a layer of paint.

Because the ring-shaped end surface of the pressure tube is enclosed by the heat-shrink sleeve, there is no gap between the heat-shrink sleeve and the outer surface of the pressure tube with an opening through which moisture could be drawn into the gap, where such moisture could lead to crevice corrosion on the outside surface of the pressure tube.

There is no need to take special measures to clean the pressure tube in preparation for the painting operation.

The heat-shrink sleeve can also be removed and a new sleeve put on without any special cleaning measures.

As a simple way of sealing off the end of the pressure tube, the tube can be worked, preferably flanged over, at the piston-rod exit end to form a more-or-less radially inward-facing end wall, which has a continuous opening in the axial direction, the diameter of this continuous opening being larger than that of the piston rod, where a radially oriented, ring-shaped gap is thus created between the piston rod and the ring-shaped surface forming the cylindrical wall of the opening, into which gap the aperture end of the heat-shrink sleeve projects.

To support the sleeve that closes off the pressure tube, the sleeve surrounds and is axially supported by the more-or-less radially inward-pointing end face of the pressure tube.

So that the piston rod is guided and the interior space of the pressure tube is sealed off from the outside, the pressure tube can be sealed at the piston-rod exit end by a piston rod guide and sealing unit, through which the piston rod extends with freedom to slide back and forth. This unit also has an end ring, which forms the closing wall, this ring being surrounded by the end wall of the pressure tube, which is preferably flanged over for this purpose.

So that the heat-shrink sleeve can extend beyond the ring-shaped surface of the pressure tube and so that the aperture area of the heat-shrink sleeve surrounding the piston rod will be located in a recess and thus protected, either the end ring or the wall closing off the pressure tube can have an end surface which faces the exit end of the piston rod and a radially oriented, annular channel extending around the circumference, which is open toward the ring-shaped opening in the end ring.

For this purpose it is possible for the diameter of the continuous opening in the end wall to be equal to or greater than that of the radially outer, cylindrical wall of the annular channel extending around the circumference.

Another possibility is for the diameter of the continuous opening in the end wall to be smaller than the radially outer, cylindrical wall of the annular channel extending around the circumference.

With either possibility, it is advantageous for the aperture end of the heat-shrink sleeve to project in a manner rounded and without kinks up to and into the radially oriented, annular channel extending around the circumference.

The gap between the pressure tube and the heat-shrink sleeve is sealed very effectively when the aperture end area of the heat-shrink sleeve rests against and encloses the more-or-less radially inward-facing end wall and extends as far as the inside wall of the pressure tube. In addition, the heat-shrink sleeve will thus also be held securely in the position in which it seals off this gap.

The sealing action can be improved by allowing the aperture end area of the heat-shrink sleeve to rest against the bottom of the annular channel and to extend radially inward toward the piston rod.

The same purpose is served by having the aperture end of the heat-shrink sleeve extend radially inward and actually rest against the cylindrical lateral surface of the piston rod.

In this case, the aperture of the pass-through opening of the heat-shrink sleeve can enclose the piston rod.

Another possibility is for the free end of the heat-shrink sleeve to enclose the piston rod in a ring-like or tubular manner.

Another way to help prevent the heat-shrink sleeve from forming kinks is to round over the transition from the cylindrical part of the pressure tube to the radially inward-directed end wall.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
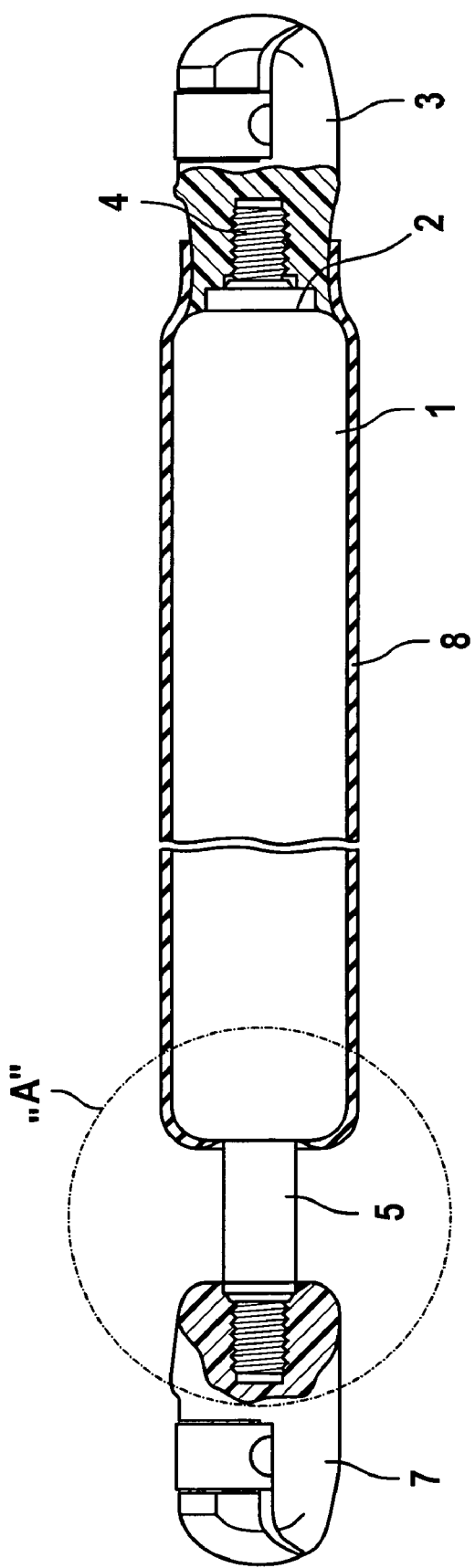
FIG. 1 shows a side view of a pneumatic spring.

The pneumatic spring shown has a pressure tube 1, in which a piston, which divides the interior space into two chambers, is free to slide back and forth in the axial direction. A threaded pin 4 is provided at one end of the pressure tube 1, namely, at the end closed off by a bottom 2, the pin being attached to the bottom 2. A connecting element 3 is screwed to this pin to facilitate the mounting of the pneumatic spring.

The piston (not shown) has a coaxial piston rod 5, which, at the end of the pressure tube 1 opposite the bottom 2, passes through a piston rod guide and sealing unit 6 and thus projects out from the interior space of the pressure tube 1.

On the free end projecting to the outside, the piston rod 5 has a threaded section, onto which a second connecting element 7 is screwed for the mounting of the pneumatic spring.

The pressure tube 1, the outside surface of which is untreated, is enclosed over its entire surface by a heat-shrink sleeve 8 to protect it from corrosion. The heat-shrink sleeve 8 also surrounds part of the connecting element 3.

At the exit end of the piston rod 5, the end of the pressure tube 1 is rounded and flanged over radially toward the inside, its flanged-over area thus forming an end wall 9 with a continuous axial opening 10. This wall extends in the radial direction with respect to the longitudinal axis of the piston rod 5. The diameter of the opening 10 in the end wall 9 is much larger than the diameter of the piston rod 5. Thus a ring-shaped gap 11 is formed between the cylindrical wall of the opening 10 and the piston rod 5.

On the end axially facing the interior of the pressure tube 1, the piston rod guide and sealing unit 6 has a sealing ring 13 with a sealing lip 12, which surrounds the piston rod 5. The radially outward-facing, lateral surface of this ring extending around the circumference is inserted tightly into the pressure tube.

On the end facing away from the interior of the pressure tube 1, the piston rod guide and sealing unit 6 has an end ring 14, the radially outer edge of the axially outward-facing surface of this ring being rounded all the way around the circumference. The end of the pressure tube 1 is flanged over in the radially inward direction and thus curves around this rounded area 15, so that the end ring 14 is supported axially against the end wall 9.

In its outward-facing end surface, the end ring 14 has a radially oriented, annular channel 16, extending around the circumference, this channel being open both axially outward toward the end surface of the end ring 14 and also radially inward toward the piston rod 5.

Figure 2:
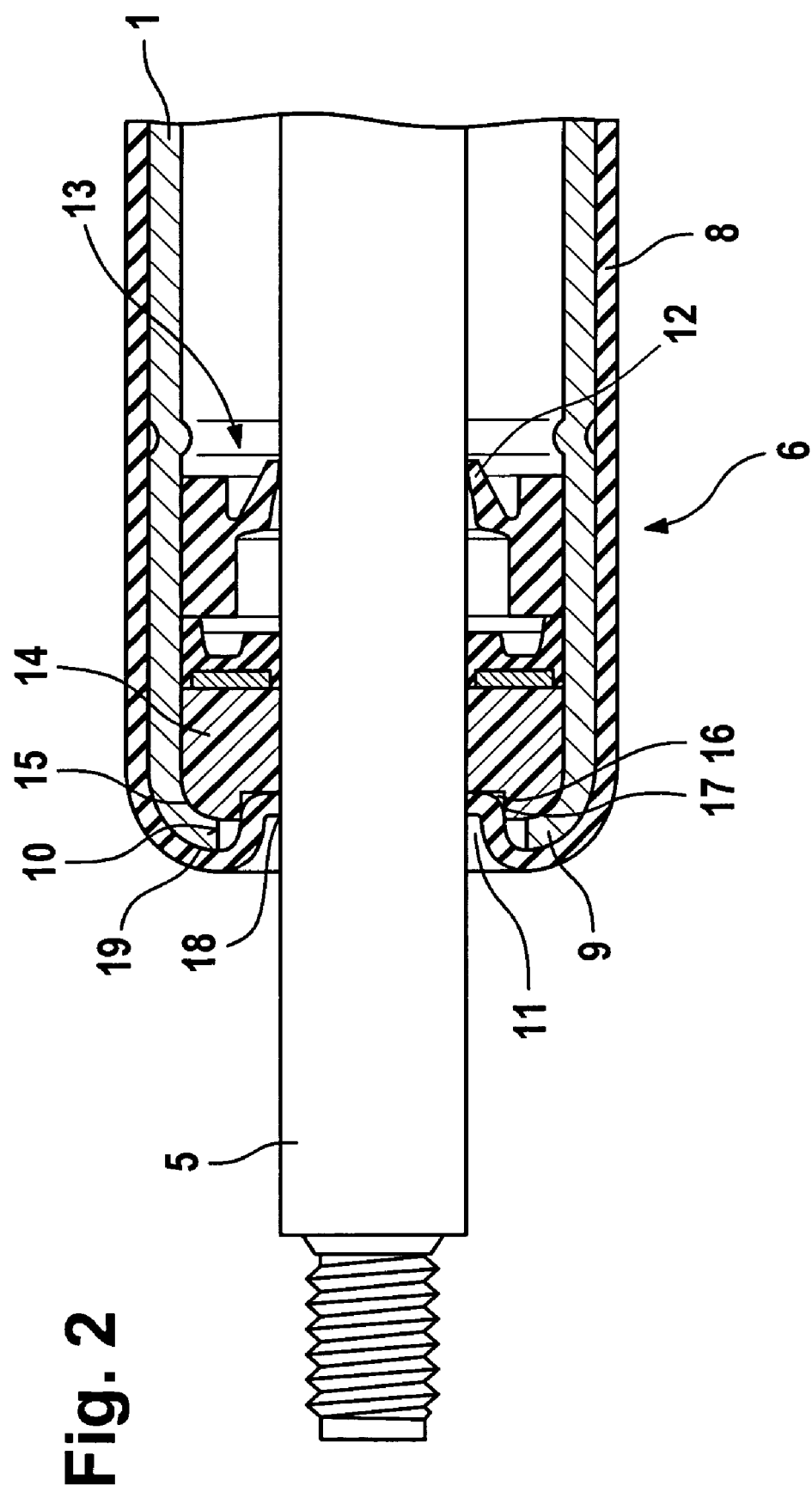
FIG. 2 shows a magnified cross-sectional view of a first embodiment of area "A" of the pneumatic spring according to FIG. 1.

In the exemplary embodiment of FIG. 2, the diameter of the opening 10 in the end wall 9 is larger than the diameter of the radially outer circumferential wall 17 of the annular channel 16.

In the exemplary embodiments of FIGS. 3–7, the diameter of the opening 10 in the end wall 9 is smaller than the diameter of the radially outer circumferential wall 17 of the annular channel 16.

In FIG. 2, at the exit end of the piston rod 5, the heat-shrink sleeve 8 rests against the end wall 9 and is guided radially inward, proceeding in an arc through the ring-shaped gap 11 and into the annular channel 16, thus covering the ring-shaped end surface 19 of the end wall. In the annular channel 16, the heat-shrink sleeve 8, which continues radially inward, encloses the piston rod 5 and rests with the thickness of its wall against the piston rod 5. This effectively prevents the intrusion of moisture from the outside into the pressure tube 1.

In FIGS. 3–7, the heat-shrink sleeve rests against the end wall 9 and proceeds radially toward the inside; it then passes around the ring-shaped surface 19 of the wall and continues all the way to the inside wall 20 of the pressure tube 1, against which it rests, and finally enters the annular channel 16'.

Figure 3:
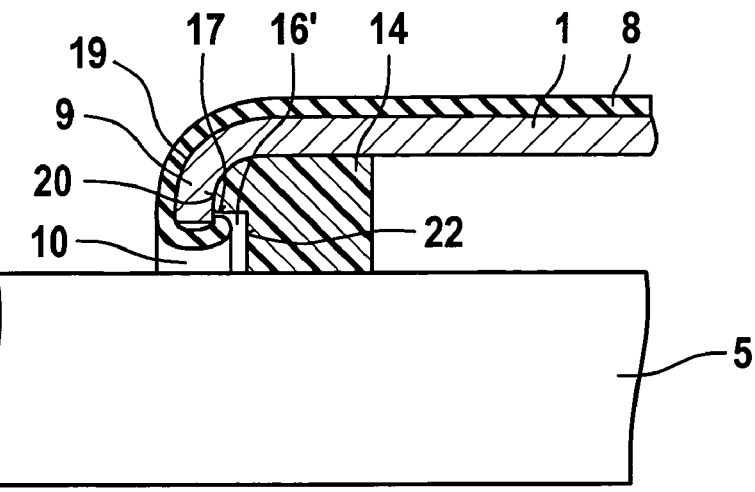
FIG. 3 shows a magnified cross-sectional view of a second embodiment of area "A" of the pneumatic spring according to FIG. 1.
Figure 4:
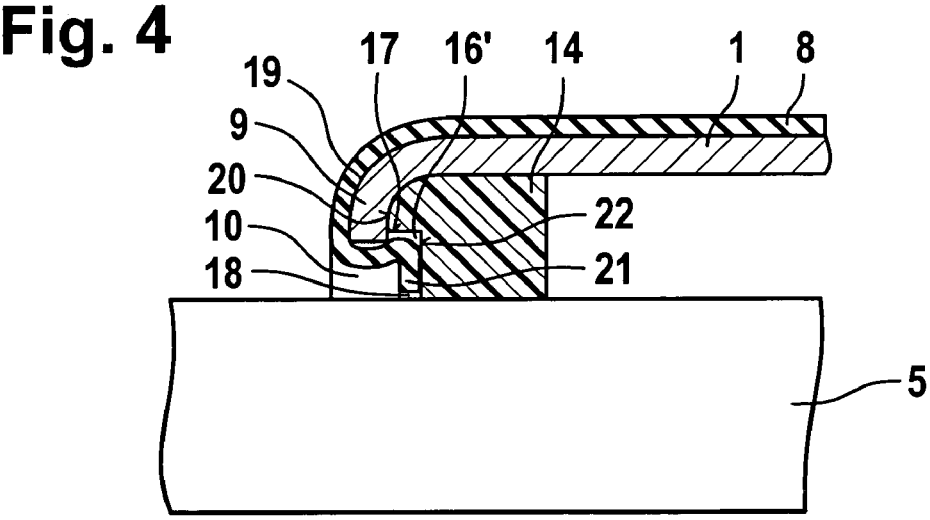
FIG. 4 shows a magnified cross-sectional view of a third embodiment of area "A" of the pneumatic spring according to FIG. 1.
Figure 5:
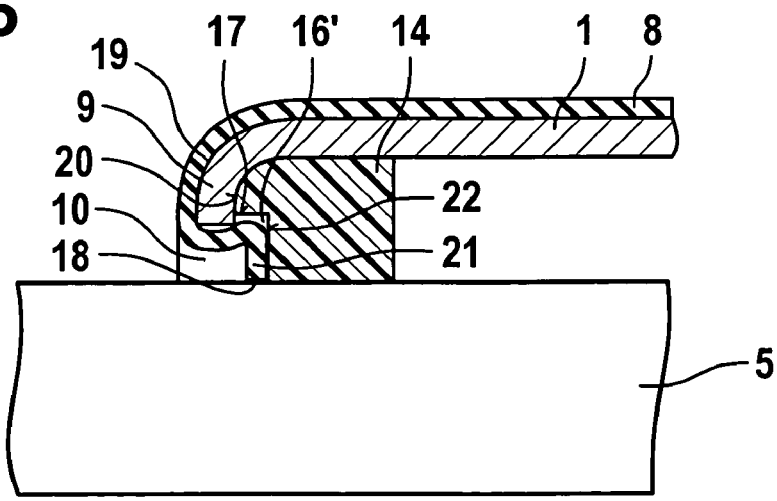
FIG. 5 shows a magnified cross-sectional view of a fourth embodiment of area "A" of the pneumatic spring according to FIG. 1.

In FIG. 3, the heat-shrink sleeve 8 ends in the annular channel 16'. In FIGS. 4–7, the heat-shrink sleeve continues along the annular channel 16'; that is, the aperture end 21 of the sleeve rests on the bottom 22 of the annular channel 16' and proceeds radially inward toward the piston rod. In FIG. 4, the aperture 18 at the end 21 of the heat-shrink sleeve 8 is a short distance away from the piston rod 5, whereas in FIG. 5 the aperture 18 of the sleeve encloses and rests against the piston rod.

Figure 6:
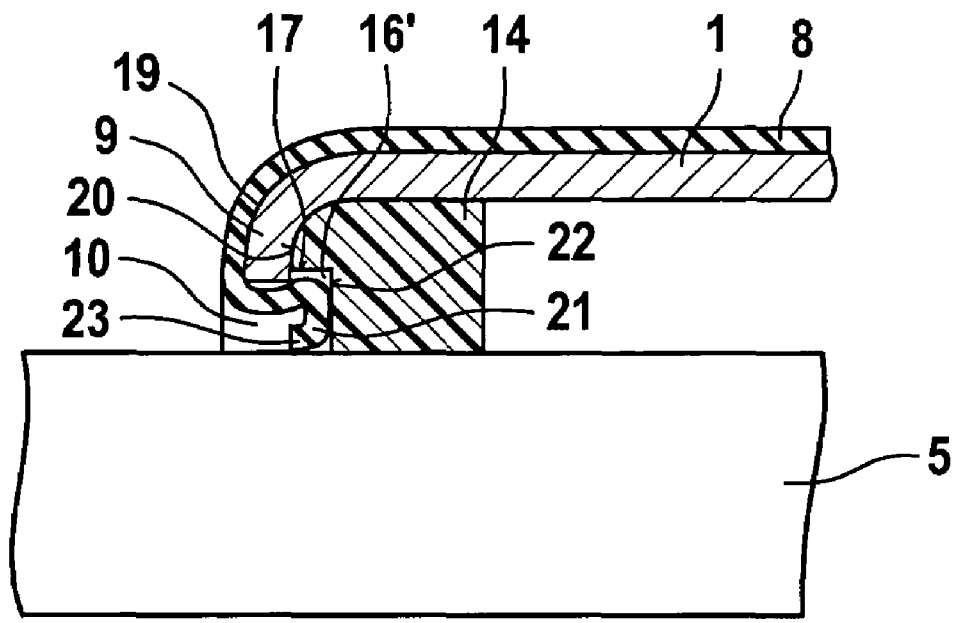
FIG. 6 shows a magnified cross-sectional view of a fifth embodiment of area "A" of the pneumatic spring according to FIG. 1.
Figure 7:
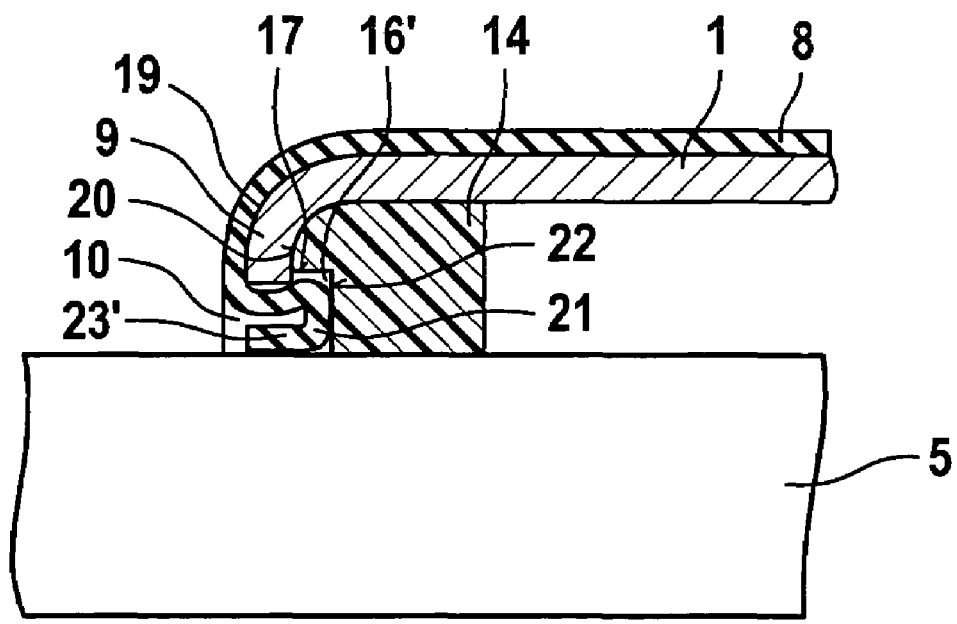
FIG. 7 shows a magnified cross-sectional view of a sixth embodiment of area "A" of the pneumatic spring according to FIG. 1.

In FIGS. 6 and 7, the end of the heat-shrink sleeve 8 extends even farther, its free end 23, 23' enclosing the piston rod 5 in a ring-like manner in FIG. 6 and in a tubular manner in FIG. 7.

To install the heat-shrink sleeve 8, the sleeve starts out with a diameter larger than that of the pressure tube 1 and can thus be easily slipped over the pressure tube 1. When the heat-shrink sleeve 8 is heated, it shrinks and thus comes to rest tightly and without folds against the pressure tube 1, against the end wall 9, and against the ring-shaped end surface 19 of the end wall 9. It is also drawn into the ring-shaped gap 11 and into the annular channel 16. In the exemplary embodiments according to FIGS. 2, 6, and 7, its aperture 18 or free end 23, 23' also surrounds and seals the piston rod 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder unit comprising:
a cylindrical pressure tube having an end with an end face surrounding a central opening, said cylindrical pressure tube being formed at said end to form an end wall, said end face facing radially inward to define said central opening;
a piston rod extending through said central opening and forming a ring-shaped gap between said piston rod and said end face; and
a heat-shrink sleeve surrounding said pressure tube and extending axially into said ring-shaped gap, enclosing said end face.

2. A piston-cylinder unit as in claim 1 further comprising a piston rod guiding and sealing unit received in said cylindrical pressure tube toward said end wall, said piston rod being axially movable through said unit, said guiding and sealing unit comprising an end ring which is enclosed by said end wall.

3. A piston-cylinder unit as in claim 2 wherein said end ring comprises an annular channel surrounding said rod and facing said ring-shaped gap.

4. A piston-cylinder unit as in claim 3 wherein the annular channel has a radially extending bottom, said sleeve resting against said bottom and extending toward the piston rod.

5. A piston-cylinder unit as in claim 4 wherein said sleeve has a free end which rests against the piston rod.

6. A piston-cylinder unit as in claim 4 wherein said sleeve has an end which encloses the piston rod in a tubular manner.

7. A piston-cylinder unit as in claim 5 wherein said annular channel has a radially outer cylindrical wall with a diameter, the central opening of the end wall having a diameter which is less than the diameter of the radially outer cylindrical wall of the annular channel.

8. A piston-cylinder unit as in claim 7 wherein the heat-shrink sleeve extends into the annular channel and overlaps a portion of the end wall extending over the annular channel.

9. A piston-cylinder unit as in claim 3 wherein said annular channel has a radially outer cylindrical wall with a diameter, the central opening of the end wall having a diameter which is greater than or equal to the diameter of the radially outer cylindrical wall of the annular channel.

10. A piston-cylinder unit as in claim 3 wherein the heat-shrink sleeve extends into the annular channel.

11. A piston-cylinder unit as in claim 1 wherein said sleeve surrounds and is axially supported by the radially inward facing end wall.

12. A piston-cylinder unit as in claim 1 wherein said cylindrical pressure tube comprises a cylindrical part and a rounded transition between said cylindrical part and said end wall.

13. A piston-cylinder unit comprising:
a cylindrical pressure tube formed with a radially inward extending end wall surrounding a central opening;
a piston rod extending through said central opening and forming an annular gap between the piston rod and the end wall;
a heat shrink sleeve surrounding the pressure tube and extending over said end wall and into said annular gap; and
an end ring received in said in said cylindrical pressure tube toward said end wall, said piston rod being axially movable through said end ring, said end ring having an annular channel surrounding said rod and facing said annular gap, said sleeve extending into said annular channel.

14. A piston-cylinder unit as in claim 13 wherein the annular channel has a radially extending bottom, said sleeve resting against said bottom and extending toward the piston rod.

15. A piston-cylinder unit as in claim 14 wherein said sleeve has a free end which rests against the piston rod.

16. A piston-cylinder unit as in claim 14 wherein said sleeve has an end which encloses the piston rod in a tubular manner.

17. A piston-cylinder unit as in claim 14 wherein said annular channel has a radially outer cylindrical wall with a diameter, the central opening of the end wall having a diameter which is less than the diameter of the radially outer cylindrical wall of the annular channel.

18. A piston-cylinder unit as in claim 17 wherein the heat-shrink sleeve extends into the annular channel and overlaps a portion of the end wall extending over the annular channel.

19. A piston-cylinder unit as in claim 13 wherein said annular channel has a radially outer cylindrical wall with a diameter, the central opening of the end wall having a diameter which is greater than or equal to the diameter of the radially outer cylindrical wall of the annular channel.

20. A piston-cylinder unit as in claim 13 wherein said cylindrical pressure tube comprises a cylindrical part and a rounded transition between said cylindrical part and said end wall.

* * * * *